United States Patent [19]
Naville et al.

[11] Patent Number: 5,758,539
[45] Date of Patent: Jun. 2, 1998

[54] LOGGING METHOD AND SYSTEM FOR MEASURING MECHANICAL PARAMETERS OF THE FORMATIONS CROSSED THROUGH BY A BOREHOLE

[75] Inventors: Charles Naville, Grigny; Jean Guesnon, Chatou; Claude Mabile, Clamart, all of France

[73] Assignee: Institut Francais Du Petrole, Rueil-Malmaison, France

[21] Appl. No.: 716,302
[22] PCT Filed: Jan. 23, 1996
[86] PCT No.: PCT/FR96/00105
  § 371 Date: Nov. 25, 1996
  § 102(e) Date: Nov. 25, 1996
[87] PCT Pub. No.: WO96/23127
  PCT Pub. Date: Aug. 1, 1996

[30] Foreign Application Priority Data

Jan. 25, 1995 [FR] France ................... 95/00938

[51] Int. Cl.⁶ .................................................. E21B 47/00
[52] U.S. Cl. .................................... 73/152.03; 73/152.16
[58] Field of Search ........................... 73/152.03, 152.16, 73/152.47, 152.58; 175/40, 50, 56

[56] References Cited

U.S. PATENT DOCUMENTS

| 3,626,482 | 12/1971 | Quichaud et al. ............... 175/50 X |
| 5,372,207 | 12/1994 | Naville et al. .................. 175/40 X |

FOREIGN PATENT DOCUMENTS

| 347295 | 12/1989 | European Pat. Off. . |
| 351902 | 1/1990 | European Pat. Off. . |
| 409304 | 1/1991 | European Pat. Off. . |
| 558379 | 9/1993 | European Pat. Off. . |

*Primary Examiner*—Michael Brock
*Attorney, Agent, or Firm*—Millen, White, Zelano, & Branigan, P.C.

[57] ABSTRACT

The present invention relates to a method for obtaining a recording or log of measurements substantially comparable to the acoustic impedance of the formations crossed through by the borehole. The measurements are obtained from an acceleration detector (11) placed in the drill string (2) between the rock-breaking bit (7) and mechanical uncoupling system (12) set between certain elements of the string. A measurement representative of the acoustic impedance of the drilled formations is obtained by processing the signal by a function of the rotating speed of the drill bit and of the depth.

21 Claims, 3 Drawing Sheets

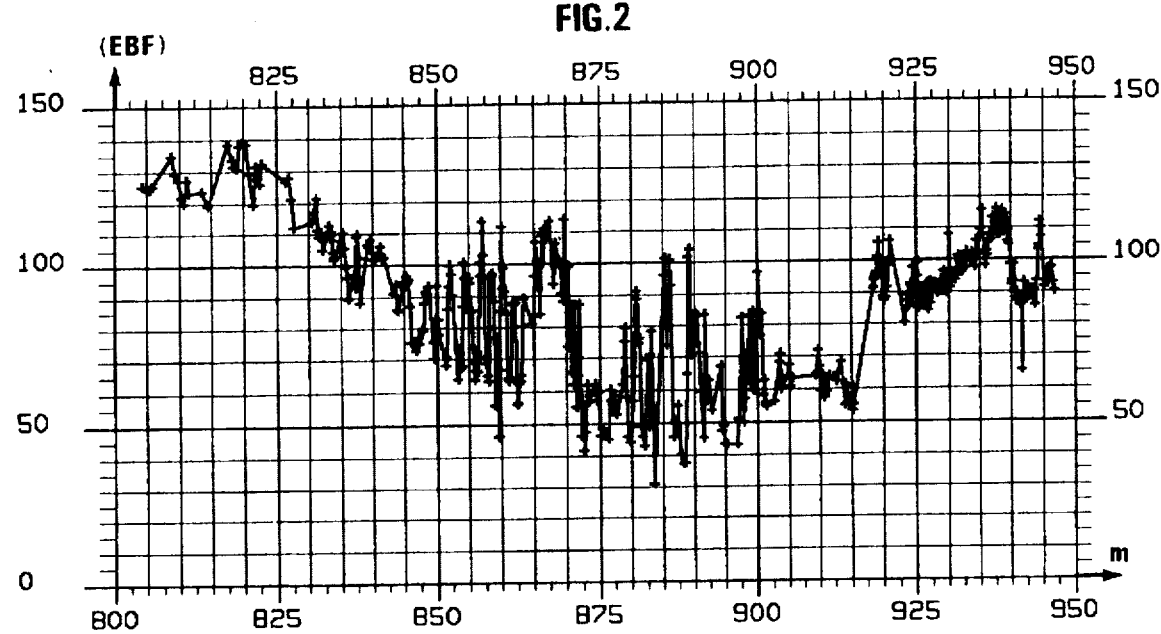
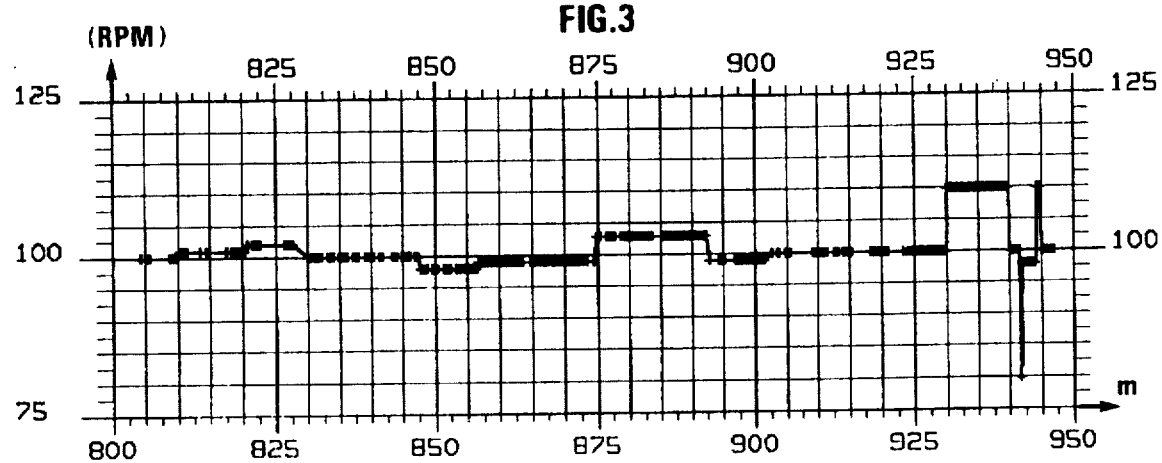

5,758,539

1

LOGGING METHOD AND SYSTEM FOR MEASURING MECHANICAL PARAMETERS OF THE FORMATIONS CROSSED THROUGH BY A BOREHOLE

SUMMARY OF THE INVENTION

The present invention relates to a method of geological exploration of the drilled formations by the obtaining of measurements substantially comparable to the acoustic impedance of the formations crossed through by the borehole.

Measurements are obtained from an acceleration detector placed in the drill string between the rock-breaking bit and mechanical uncoupling means arranged between certain elements of the string. Suitable means for processing the unprocessed acceleration measurements allow the measuring results to be exploited after processing in a way that is similar to the exploitation of a log provided by a conventional "sonic" logging tool, possibly coupled with another logging tool, for example for measuring the density of the formation.

The present invention thus relates to a method of geological exploration of the formations drilled by a drill bit fastened to the end of a drill string, said string comprising measuring means delivering a signal representative of the acceleration created by said bit. Mechanical uncoupling means are placed in the drill string, said measuring means are set between said drill bit and said uncoupling means, and a measurement representative of the acoustic impedance of the drilled formations is obtained by processing said signal by a function of the rotating speed of the bit and of the depth.

The acceleration measurement can be considered in a time window ranging between 5 and 30 s, and said processing can notably consist:

in calculating in this window an effective amplitude representative of said acceleration signal,
  in dividing said amplitude by the rotating speed of the bit, and possibly by the rate of penetration raised to a power close to 0.1,
  and in multiplying by a function of the form aPf+b, where a and b are constants related to the borehole environment, notably the depth, and Pf is the bottomhole pressure.

The means for measuring the acceleration can include at least one accelerometer placed so as to measure a signal representative of the axial acceleration, i.e. substantially along the axis of the borehole.

The means for measuring the acceleration can include at least one accelerometer placed so as to measure a signal representative of the rotational acceleration. They can include at least one accelerometer placed so as to measure a signal representative of the flexural acceleration. Said accelerometers can have at any time a known orientation in space.

Changes in the nature of the drilled formations can be determined from the variations of said measurement representative of the acoustic impedance.

Changes in the pore pressure of the drilled formations can be deduced from the variations of said measurement representative of the acoustic impedance.

Seismic pickups can be placed at the surface, from which seismic uphole times can be deduced, the source being the noise of the drill bit, for example of the tricone type. In the method, a synthetic seismic response in uphole two-way time can be calculated from said measurement representative of the acoustic impedance and said uphole times.

The invention further relates to a system of geological exploration of formations drilled by a drill bit fastened to the end of a drill string, said string comprising means for measuring a signal representative of an acceleration created by said bit. The system includes mechanical uncoupling means, measuring means placed between the drill bit and said uncoupling means, and means for processing the signal representative of the bit acceleration and delivered by said measuring means. The measuring and/or processing means can include memories for storing the signals.

The uncoupling means can uncouple mechanically the axial motions of the lower part of the drill string from the upper part of the string.

The uncoupling means can uncouple mechanically the rotating motions of the lower part of the string from the upper part of the string.

The system can include means for sending to the ground surface at least part of the signal representative of the bit acceleration.

BRIEF DESCRIPTION OF THE DRAWINGS

Other features and advantages of the invention will be clear from reading the description hereafter of embodiments given by way of non limitative examples, with reference to the accompanying drawings in which:

FIG. 2 shows a log of the unprocessed signal EBF provided by an axial acceleration detector, FIG. 3 shows the log of the rotating speed of the drill bit.

DESCRIPTION OF THE PREFERRED EMBODIMENTS

Figure 1:
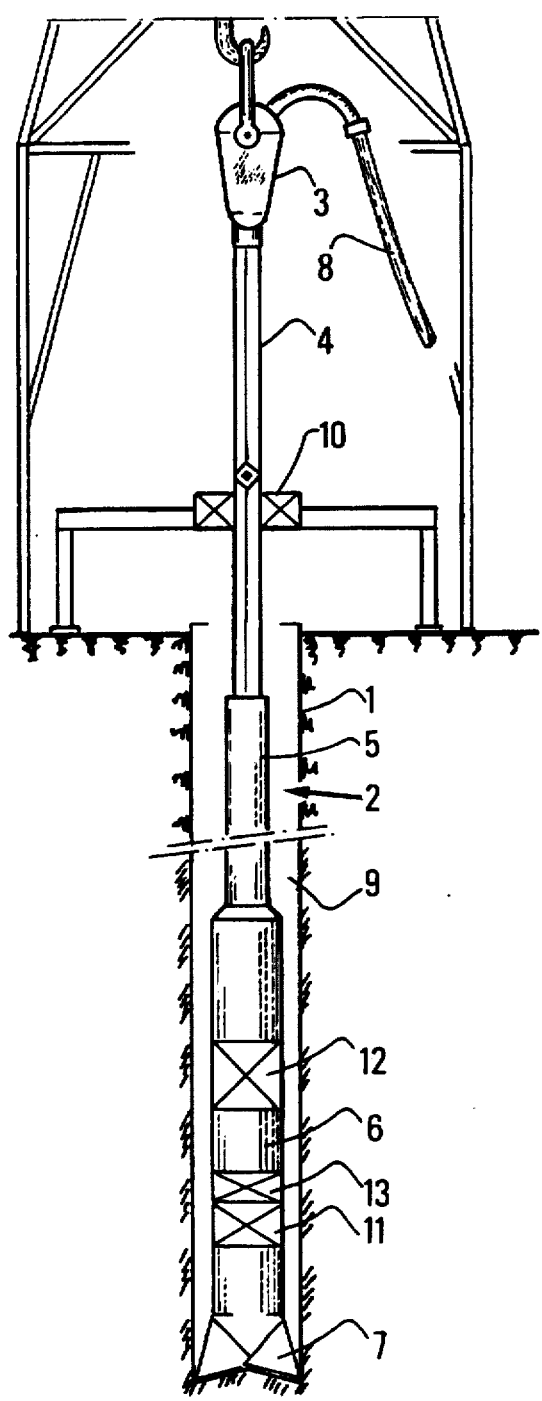
FIG. 1 diagrammatically shows the measurement acquisition architecture according to an embodiment of the present invention.

FIG. 1 shows a borehole 1 in the process of being drilled by means of the drill string 2. String 2 is fastened to the pipe hook by means of the swivel 3, of the kelly 4. Kelly 4 is screwed onto a drillpipe string 5 at the end of which is assembled the bottomhole assembly 6 ended with the drill bit 7. A drilling fluid is injected into the inner space of the string through the flexible tube 8 connected to pumps. The fluid flows out of the string through the nozzles of bit 7, then it flows back towards the ground surface by carrying along the drill cuttings in the annular space 9 defined by the outside of the string and the walls of borehole 1.

The advance of the drill bit is achieved by bringing the bit into rotation according to the rotary system, by means of the whole of the drill string that is driven into rotation, either by the rotary table 10 and kelly 4, or by a swivel 3 of the power swivel type. The bit can also be brought into rotation by means of a hydraulic downhole motor, the bit being fastened to the rotor thereof.

According to the invention, the bottomhole assembly 6, commonly referred to as "BHA", comprises measuring means 11 including at least detectors for measuring the acceleration induced by the rock breaking work of the drill bit. As it is known in the profession, accelerations can be measured by at least one accelerometer situated in a specific sub. Such a use of an accelerometer is notably illustrated by documents U.S. Pat. No. 5,226,332 and FR-92/02.273. For the measurements acquired thereby to be exploitable according to the present invention, a mechanical uncoupling system 12 is placed in the bottomhole assembly above measuring means 11, so that the longitudinal (along the axis of the string) or the transverse vibrations created by the bit are mechanically uncoupled from the part of the string consisting of the drillpipes 5 and the bottomhole assembly located above uncoupling means 12. The purpose of the uncoupling means is to suppress or at least to limit the phenomena related to the drillpipe string dynamics, notably to the parasitic resonance or reflection vibrations.

The uncoupling means can be known devices such as shock absorbers that are used by drill men for filtering the vertical motions created by the drill bit. These devices allow the bit to be driven into rotation by the drill string and they comprise longitudinal buffers in the form of metallic or elastic, notably elastomer springs. It is well-known that certain shock absorbers also have a damping effect on the motion of rotation, in particular those made from elastomer connecting the lower part of the buffer to the upper part. In fact, the latter also damp the rotational vibrations on top of the longitudinal vibrations, the elastomer transmitting the torque between the upper part and the lower part.

Bumper subs can also be used as mechanical uncoupling means. The bumper sub consists of a male part that slides in a female part, the length of the male part being so adapted that the sliding length is at least about 1 meter (3 feet). The male and female parts are connected in rotation by a system of keys in grooves so that the rotation of the whole of the string can be transmitted to the drill bit. During drilling, the bumper sub must not be in an upper or lower extreme position. In this case, there is a mechanical uncoupling between what is placed below and above the bumper sub. Of course, this means that the weight on bit is then limited to the mass of the elements screwed below the bumper sub.

The device according to the invention can comprise first measurement processing and acquisition means 13 next to the measuring means 11, and preferably in the same sub. These first means manage the detectors and their power supply, and they preferably deliver a signal by calculating an effective amplitude in a time window ranging between 5 and 30 s. The so-called "effective" amplitude can be the square root of the autocorrelation peak of the acceleration along the same axis. Another equivalent statistical estimator can consist in taking the mean of the absolute values of the signal in said window. This preprocessed signal is representative of the effective acceleration along the axis of measurement of the detectors. Of course, any other estimator can be used without departing from the scope of the present invention.

The curves of FIGS. 2, 3, 4 and 5 are plotted on a graph having the depth in meter, here the interval between 800 m and 950 m, as the abscissa and the amplitude of the signal as the ordinate.

FIG. 2 shows such a signal (EBF) representative of the axial acceleration while drilling between about 800 m and 950 m in depth.

FIG. 3 shows a log of the rotating speed while drilling in the same interval. In this example, the rotating speed recorded is the rotating speed of the rotary table. In other cases, the true rotating speed of the bit could be exploited by measuring it or by deducing it from measuring detectors placed next to the drill bit.

The signal EBF is compensated by dividing signal EBF by the rotating speed and mutliplying by a function of the form:

aPf+b where Pf is the bottomhole pressure, therefore a function of the vertical depth of the borehole and of the density of the fluid, a and b being constants related to the borehole environment, particular tectonics, abnormal pressures, type of shock absorber, BHA, . . .

EBF can also possibly be divided by the rate of penetration raised to a power close to 0.1. The rate of penetration, not shown here, is a measurement that is always available on a drill rig, for example by measuring the vertical displacement of the block, then by integrating with respect to time.

Figure 4:
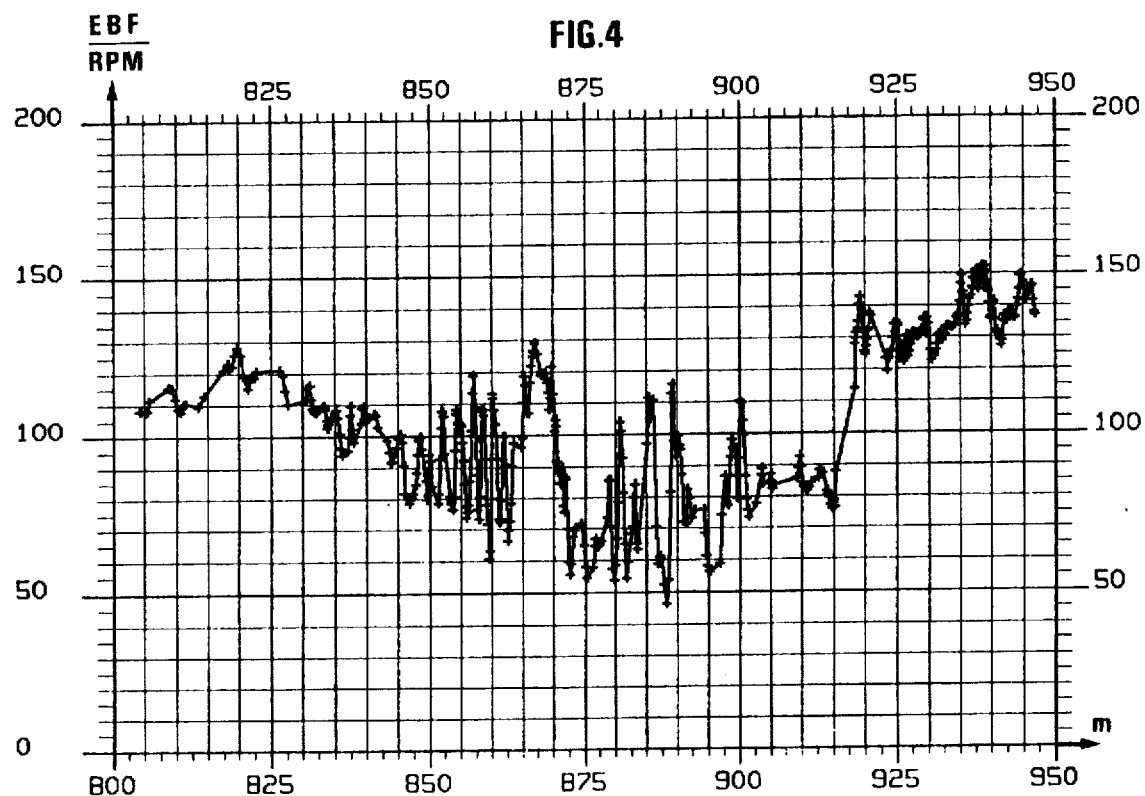
FIG. 4 shows the log of the measurement according to the invention, after compensation and smoothing.

Signal EBF, once compensated, is shown in FIG. 4.

Figure 5:
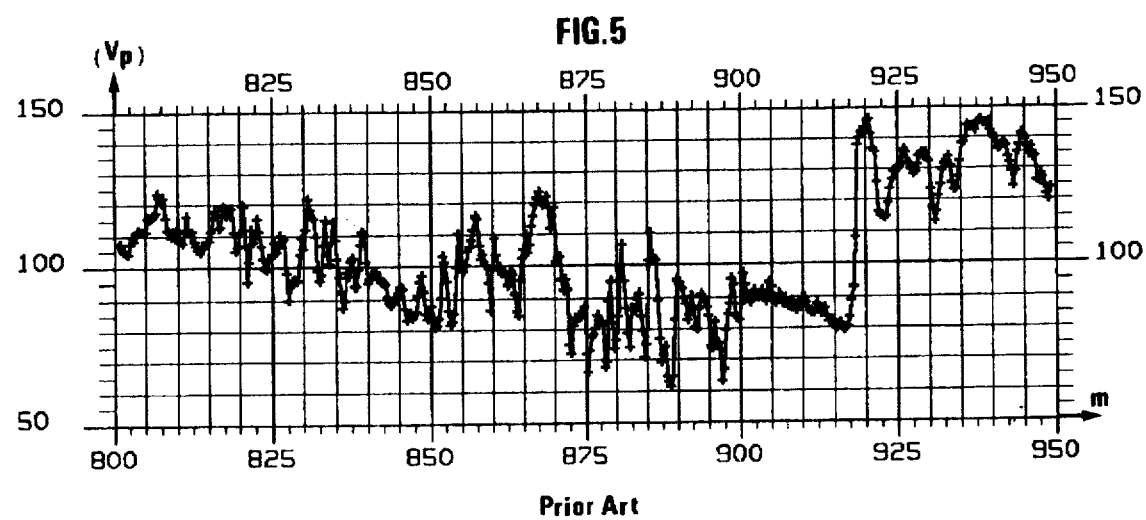
FIG. 5 shows by way of comparison, on the same formation interval, an acoustic impedance log provided by conventional logging tools, FIG. 6 diagrammatically shows different transmission means.

FIG. 5 shows the calculation of the acoustic impedance of the formations crossed through by the borehole in the interval considered, i.e. 800–950 m. This recording is obtained by a "Sonic" type acoustic log that gives the velocity Vp of the compressional waves. This logging of a well-known type is generally performed in the form of a wireline logging, i.e. with a tool lowered into the hole at the end of a cable, the drill string being out of the hole. Together with the use of a "sonic" tool, it is a common procedure to operate at the same time a tool giving the density of the formations crossed, for example a Gamma-Gamma radiation tool. The log of FIG. 5 shows the product of Vp by the density, i.e. the acoustic impedance of the formations.

It is clear, by comparing the curves of FIG. 4 and of FIG. 5, that the compensated signal EBF is very close to the acoustic impedance measurement that can be obtained by known means. In particular, the phenomenon between depth points 865 and 870 m is reproduced, as well as the impedance variation of the formations at point 918 m.

The present invention thus allows to obtain acoustic impedance values from the signal delivered by an accelerometer, said signal being compensated in a simple and determined way according to the present example.

The procedure for implementing the system according to the invention depends on the measurement transmission means.

Figure 6:
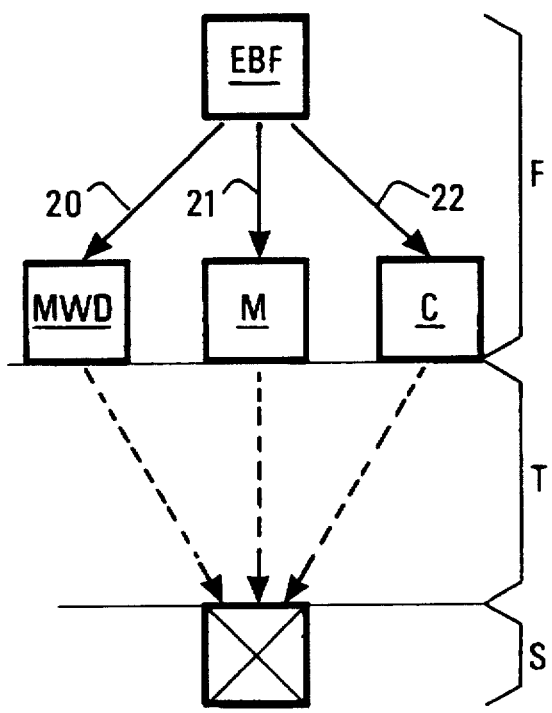

FIG. 6 schematizes the main configurations of the transmission of the signal to the surface. Three geographic zones are represented by braces F, T and S. F represents the bottomhole, in the neighbourhood of the drill bit, T the transmission zone, intermediate between bottomhole F and the surface zone S where knowledge of the acoustic impedance measurement is useful. Square EBF represents the acceleration detectors, their management and supply means. Arrows 20, 21, 22 respectively directed towards squares MWD, M and C, represent the electric links in three transmission instances. Square MWD symbolizes a means for processing and for coding the signal EBF, compensated or not, averaged or not, to be transmitted to the surface by pressure waves or by electromagnetic waves. Such a technique is now well known in the profession. The rate of information to be transmitted is compatible with the capacity of such a system. Square M symbolizes a memory for storing values EBF, compensated or not. During a given drilling interval, signals EBF are stored downhole. After drilling the interval, the drill man performs a memory unloading operation by lowering a connector into the drill string at the end of a cable, by connecting it onto a complementary connector linked with the memory, then by pulling up the cable and the connector once the memory has been dumped by means of the electric link. The measurements are thereafter processed at the surface. Square C symbolizes electronic means, for example amplification, coding or multiplexing means, said means being connected to the surface by a continuous conductor. The continuous line can consist of cabled drillpipes, of a cable coaxial to the drill string, or of both in a mixed configuration. Such a transmission is illustrated in documents FR-92/02.273 or EP-A-526,293.

Simplified knowledge of the acoustic impedance of formations in the process of being drilled is interesting for deducing the nature of the rocks that are drilled by the bit. Changes in the formations can thus be detected during drilling by observing variations in the impedance of the formations. The logging provided by the present invention is a complement to the mud loggings that are already available, such as the rate of penetration, the torque about the drill bit, the pressure, the analysis of the cuttings or of the gases present in the mud.

Drilling safety can be increased by the more reliable detection of zones with an abnormal pore pressure, for example the transition zones of cap rocks or of shallow gases.

We claim:

1. A method of geological exploration of formation comprising drilling a borehole to a depth into the formation, said drilling being conducted by a drill bit (7) fastened to the end of a drill string (2), said string comprising measuring means (11) delivering a signal representative of an acceleration created by said bit, wherein mechanical uncoupling means (12) are placed in the drill string, said measuring means are set between said drill bit (7) and said uncoupling means (12), and a measurement representative of the acoustic impedance of the drilled formation is obtained by processing said signal by a function of the rotating speed of the drill bit and of the depth of the borehole.

2. A method as claimed in claim 1, wherein the acceleration measurement is considered in a time window ranging between 5 and 30 s, said processing comprising:

calculating in this window an effective amplitude representative of said acceleration signal, dividing said amplitude by the rotating speed of the drill bit, and optionally by the rate of penetration raised to a power of about 0.1, and multiplying said amplitude by aPf+b, where a and b are constants related to the borehole environment, notably the depth, and Pf the bottomhole pressure.

3. A method as claimed in claim 2, wherein the acceleration measuring means (11) comprises at least one accelerometer placed so as to measure a signal representative of the axial acceleration substantially, along the axis of the borehole.

4. A method as claimed in claim 2, wherein pore pressure changes in the drilled formations are deduced from variations in said measurement representative of the acoustic impedance.

5. A method as claimed in claim 4, wherein seismic pickups from which seismic uphole times are deduced are placed at the surface, the source being the noise of the drill bit, characterized in that a synthetic seismic response in uphole two-way time is calculated from said measurement representative of the acoustic impedance and said uphole times.

6. A method of claim 2, wherein seismic pickups from which seismic uphole times are deduced are placed at the surface, the source being the noise of the drill bit, characterized in that a synthetic seismic response in uphole two-way time is calculated from said measurement representative of the acoustic impedance and said uphole times.

7. A method as claimed in claim 2, wherein acceleration measuring means comprises at least one accelerometer placed so as to measure a signal representative of the rotation acceleration.

8. A method as claimed in claim 1, wherein the acceleration measuring means (11) comprises at least one accelerometer placed so as to measure a signal representative of the axial acceleration, substantially along the axis of the borehole.

9. A method of claim 8, wherein seismic pickups from which seismic uphole times are deduced are placed at the surface, the source being the noise of the drill bit, characterized in that a synthetic seismic response in uphole two-way time is calculated from said measurement representative of the acoustic impedance and said uphole times.

10. A method as claimed in claim 8, wherein acceleration measuring means comprises at least one accelerometer placed so far as to measure a signal representative of the rotation acceleration.

11. A method as claimed in claim 8, wherein pore pressure changes in the drilled formations are deduced from variations in said measurement representative of the acoustic impedance.

12. A method as claimed in claim 1, wherein the acceleration measuring means comprise at least one accelerometer placed so as to measure a signal representative of the rotational acceleration.

13. A method as claimed in claim 1, wherein changes in the nature of the drilled formations are determined from variations in said measurement representative of the acoustic impedance.

14. A method as claimed in claim 1, wherein pore pressure changes in the drilled formations are deduced from variations in said measurement representative of the acoustic impedance.

15. A method of claim 14, wherein seismic pickups from which seismic uphole times are deduced are placed at the surface, the source being the noise of the drill bit, characterized in that a synthetic seismic response in uphole two-way time is calculated from said measurement representative of the acoustic impedance and said uphole times.

16. A method as claimed in claim 1, wherein seismic pickups from which seismic uphole times are deduced are placed at the surface, the source being the noise of the drill bit, characterized in that a synthetic seismic response in uphole two-way time is calculated from said measurement representative of the acoustic impedance and said uphole times.

17. A method as claimed in claim 1, wherein the acceleration measurement is considered in a time window ranging between 5 and 30 s, said processing comprising:

calculating in this window an effective amplitude representative of said acceleration signal, dividing said amplitude by the rotating speed of the drill bit and by the rate of penetration raised to a power of about to 0.1, and multiplying said amplitude by aPf+b, where a and b are constants related to the borehole environment, notably the depth, and Pf the bottomhole pressure.

18. A method as claimed in claim 17, wherein the acceleration measuring means (11) comprises at least one accelerometer placed so as to measure a signal representative of the axial acceleration, substantially, along the axis of the borehole.

19. A method as claimed in claim 17, wherein pore pressure changes in the drilled formations are deduced from variations in said measurement representative of the acoustic impedance.

20. A method as claimed in claim 17, wherein seismic pickups from which seismic uphole times are deduced are placed at the surface, the source being the noise of the drill bit, characterized in that a synthetic seismic response in uphole two-way time is calculated from said measurement representative of the acoustic impedance and said uphole times.

21. A method as claimed in claim 17, wherein acceleration measuring means comprises at least one accelerometer placed so as to measure a signal representative of the rotation acceleration.

* * * * *